(12) United States Patent
Einighammer et al.

(10) Patent No.: US 6,404,904 B1
(45) Date of Patent: Jun. 11, 2002

(54) SYSTEM FOR THE TOUCHLESS RECOGNITION OF HAND AND FINGER LINES

(75) Inventors: Hans J. Einighammer, Düsseldorf; Jens Einighammer, Tübingen, both of (DE)

(73) Assignee: TST-Touchless Sensor Technology AG, Neu-Ulm (DE)

( * ) Notice: Subject to any disclaimer, the term of this patent is extended or adjusted under 35 U.S.C. 154(b) by 0 days.

(21) Appl. No.: 09/298,117

(22) Filed: Apr. 23, 1999

(30) Foreign Application Priority Data

Apr. 24, 1998 (DE) .......................... 198 18 229

(51) Int. Cl.[7] .................................. G06K 9/00
(52) U.S. Cl. .......................... 382/124; 356/71
(58) Field of Search ................... 382/115, 116, 382/119, 120, 124, 126; 356/71; 340/5.53, 5.83; 713/186

(56) References Cited

U.S. PATENT DOCUMENTS

| | | | | |
|---|---|---|---|---|
| 4,160,237 A | * | 7/1979 | Mcmahon | 382/322 |
| 4,385,831 A | * | 5/1983 | Ruell | 356/71 |
| 4,936,680 A | * | 6/1990 | Henkes et al. | 356/71 |
| 5,177,802 A | | 1/1993 | Fujimoto et al. | |

FOREIGN PATENT DOCUMENTS

EP 0 294 716 12/1988
FR 2 587 522 9/1985

OTHER PUBLICATIONS

Brockhaus Enzyklopädie, 19th edition, p.313.
Bracewell (1989) "Die Fourier–Transformation", Spektrum der Wissenschaft pp. 90–99 (Hartley transformation).
Fingerprints, http://library.thinkquest.org/17133/fingerprints.html (Henry system of classification).

* cited by examiner

Primary Examiner—Andrew W. Johns
Assistant Examiner—Seyed Azarian
(74) Attorney, Agent, or Firm—Collard & Roe, P.C.

(57) ABSTRACT

A process for reproducing hand and/or finger lines with a camera works without skin contact with the recording device. By using linearly or circularly polarized light in the paths of the illuminating and the reproducing light rays, it is possible to obtain separate representations of the patterns of the epidermis and the hypodermis. An image of the relief of the skin that is rich in contrast is obtained in this way, and it is possible to acquire information from the deeper disposed layers of the skin already supplied with blood. An algorithm searches the skin patterns of the palm of the hand for line elements of different strengths and directions (vectors). The computed numerical identification contains overall frequencies of vectors as well as amplitudes and phases of frequency components of projections of the vector image of both patterns. The process permits placing the person to be identified in a separate location from the measuring device, thereby offering complete protection of the system and enhanced security against fraud.

38 Claims, 5 Drawing Sheets

SYSTEM FOR THE TOUCHLESS RECOGNITION OF HAND AND FINGER LINES

BACKGROUND OF THE INVENTION

1. Field of the Invention

The invention relates to a process and a device for the identification of persons by optically reproducing hand and finger lines or prints without skin contact—denoted here as touchless—and a recognition algorithm for implementing the system.

2. The Prior Art

In the field of criminology, the patterns of the papillary ridges of the fingers have been employed for a long time by obtaining fingerprints on objects or on paper. These patterns have also been used by illiterate persons as their signature. More recently, these patterns have gained significance as an authorization control code for access to safes, safe-deposit rooms of banks, computers and other secured objects.

However, filing of a permanent color or hard-copy imprint is not practicable when it is desired to have an evaluation done by a computer rapidly. Also, these prior methods presuppose that the same applicator is in each case used frequently. Therefore, methods were developed first which make the picture of the imprint briefly visible on a glass surface through optical reproduction by exploiting impeded total or partial reflection on a refractive interface.

Patterns of the lines in the palm are also suitable for the identification of persons. Imprinting palm patterns on a glass surface is also feasible; however, this method failed to gain wide acceptance because the equipment would have to be substantially larger and more complicated to accommodate the palm. Therefore, the development of evaluation algorithms for this method has not yet reached an advanced stage.

A number of factors adversely affect an access control system based on a skin line imprint method, particularly one designed for use by a large number of persons unobserved and anonymously.

(1) In such systems, the measuring or contact pressure surface gets dirty to the point where the evaluation algorithm can no longer correctly function. Dirt, of course, could be removed by simply wiping it off, or if necessary with cleansing agents. However, the drawback is that the correct functioning of the system requires the cooperation and maintenance on the part of the participating people to keep the surface clean, which cannot always be expected, or alternatively, the user operating the system has to carry out the care and maintenance work, which is both cost- and labor-intensive.

(2) The contact surface of the sensor is a part of the path of the measuring rays that has to be always freely accessible, so that important components of the system may be damaged in the event of vandalism or sabotage.

(3) The contact pressure surface of the applicator is used by a great number of persons, which, for hygiene reasons, should be avoided, particularly in hospitals and medical and biological safety areas.

(4) The contact pressure surface of the applicator may transmit chemical or radioactive contamination.

(5) Methods requiring skin contact are less accepted than other methods for psychological reasons, for example, because of their association with a data file on "criminals", fear of infection, or aversion to skin contact.

(6) Most known optical imprinting methods make a reproduction of the outermost surface of the skin by recording interference with the reflection on a surface of glass. This has a negative effect inasmuch as inhomogeneities of the skin disposed at deeper levels of the skin, as well as blood circulation patterns, which contain individual information as well, are not accessible in this way. This limits the clarity and definition of such methods.

(7) Many known methods of skin pattern detection are designed to determine the genuine surface structure of the skin (i.e., the relief of the skin). The drawback here is that plastic reproduction methods can easily reproduce the relief of the skin, which consequently creates possibilities for fraud.

(8) With all methods requiring skin contact, a slightly visible imprint, i.e., the classical imprint of a finger or hand line, remains on the surface of the apparatus. The drawback here is that this imprint can be made visible and can be misused with means employed for detecting and securing traces. For this reason, imprints made during skin contact methods must be removed, for example, by wiping them off in cases where high safety requirements need to be satisfied.

(9) The simple conventional method, which reproduces skin lines with a camera without contact with the object also has drawbacks. Since the skin is always slightly translucent under conventional illumination, and the light scattered diffused to a certain extent, and since the uppermost layer of the papillary ridges is reflected at the same time in a more or less shiny way, the camera, like the human eye, normally "sees" an undefined superpositioning of the images of the epidermis and hypodermis.

It is generally possible with illumination aimed at an angle, i.e., slanted, to increase the contrast of the papillary ridges and furrows of the skin. The drawback here is that this method does not work uniformly throughout the entire field of vision, but rather is dependent upon the direction of the line pattern relative to the illumination (shadow effects),. as well as upon the waviness of the surface of the object (gloss effects). Inclined illumination from all sides, or diffused illumination does in fact compensate for waviness optically, but deteriorates the contrast of the ridges because diffused reflection increases.

A relatively strong gloss and contrast effect is obtained with inclined illumination and inclined recording direction (according to the laws of reflection) particularly with large angles of incidence or recording. The drawback here is that when the object is set at an angle, or inclined, correction of distortion is required, for example according to SCHEIMPFLUG, which requires expensive equipment. The waviness of the skin also results in image distortions with this method.

SUMMARY OF THE INVENTION

The drawbacks of known methods as described above are reduced or eliminated according to the invention which relates to a process that works without skin contact.

By employing polarized light, the operating mode can be enhanced according to the invention. Polarizing light not only (a) substantially increases the contrast of the papillary ridges through preferred reproduction of the glossy or shiny structures, but also (b) filters out the shiny structures to make the papillary ridges visible so that the pattern of the hypodermis becomes visible. In particular, by using polarized light in the path of the illuminating rays and in the path of the reproducing light rays, it is possible to select in a defined way the pattern of the epidermis and the pattern of the hypodermis. The invention makes possible an accentuated representation of the shiny epidermis alone, an accentuated representation of the diffusely reflecting hypodermis alone, or a representation of both skin patterns in combination, for example one right after the other. The pattern of the hypodermis is predominantly supplied by the structures disposed at deeper levels, in particular by the structures of the adjacent layers of the skin that are already supplied with blood. In the case of linearly polarized light, the pattern of the epidermis is reproduced if the polarizing devices are set in parallel to the paths of the illuminating and reproducing rays, and the pattern of the hypodermis is reproduced when the polarizing devices are adjusted vertically.

In the case of circularly polarized light, the pattern of the epidermis is reproduced when the rotation of polarization in the paths of the illuminating and reproducing rays is adjusted in different senses, and the pattern of the hypodermis is reproduced when it is adjusted in the same sense. The direction of rotation (right or left rotation) is defined here as the direction of rotation of the E-vector, looking in the direction of propagation of the light.

The benefits offered by the invention can be described in detail as follows:

(1) The sensor system is protected against soiling or contamination by the user because it is not touched, which makes frequent care and control unnecessary.

(2) The system can be completely accommodated behind a protecting wall, for example bulletproof glass, so that it is protected against vandalism or sabotage.

(3) The devices can be designed to exclude indirect contact with other persons and promote hygiene.

(4) The devices can be designed so that no chemical or radioactive contamination is transmitted.

(5) Psychological reasons such as association with a "file on criminals", fear of infection or fear of skin contact are eliminated because the device operates without requiring contact.

(6) The present invention makes accessible structures of the hypodermis with additional information content that are inaccessible with a number of optical contact methods.

(7) The safety against fraud is enhanced because hypodermis structures, like watermarks, cannot be copied or counterfeited easily. It is also particularly difficult to successfully combine the two different types of contrast for fraudulent purposes.

(8) No finger or skin line imprint is produced on the apparatus that could be fraudulently used, for example for producing a skin duplicate, for example made of rubber.

(9) As opposed to conventional reproduction with a camera, the present invention permits separate imaging and evaluation of the epidermis and hypodermis.

(10) In the field of the face, the process as defined by the invention permits a uniform effect independent of the direction of the lines and waviness of the surface. No inclined positioning of the object is required for exploiting the gloss angle condition, and the rectification connected therewith is therefore not needed.

BRIEF DESCRIPTION OF THE DRAWINGS

Additional details of the invention are contained in the following detailed description and the attached drawings in which preferred embodiments are illustrated by way of example.

In the drawings, similar reference characters denote similar elements throughout the several views wherein.

Figure 1:
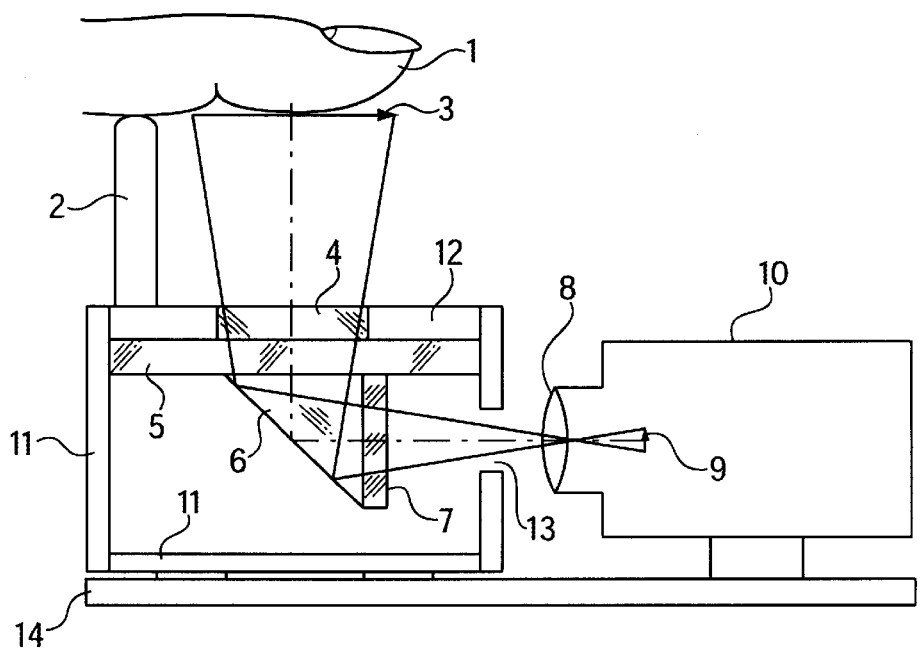
FIG. 1 is a side view of a first device for recognizing finger lines without contact.
Figure 2:
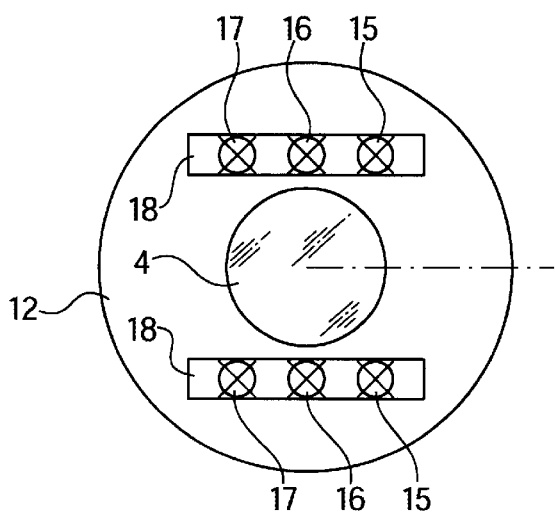
FIGS. 2 and 3 show by a top and a front view, respectively, of the path of the illumination beam of light rays of the device shown in FIG. 1.
Figure 3:
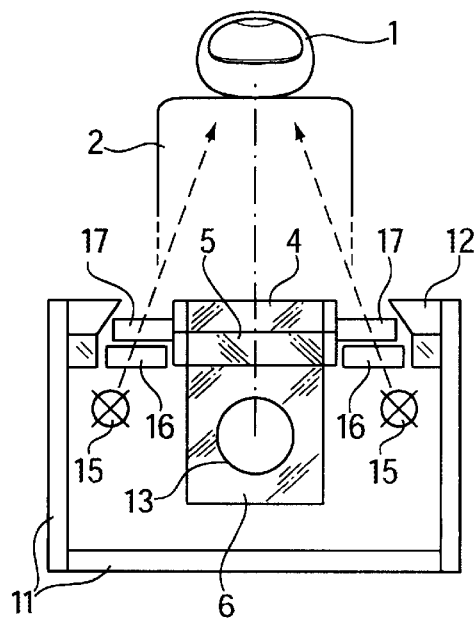

A device for reproducing finger lines is described by way of example in FIGS. 1 to 3, in which the device is designed as a table model and is adjusted in a certain way for reproducing the epidermis. Finger 1 is placed on the support 2, so that it is disposed in object plane 3 or its zone of sharp focus, in order for it to be photographed with camera 10 via an interference light filter 4, carrier plate 5 (e.g. acrylic glass), reversing prism 6 and polarization filter 7.

Camera 10 contains the lens 8 and an image receiver (for example a CCD-chip) in image plane 9, and, furthermore, may contain components (not shown) for image processing. Components 4, 5, 6 and 7 are optically cemented with each other for constructional reasons, whereby retaining plate 5is joined with housing pot 11 in a fixed way. Cover plate 12, which has to absorb and dissipate certain forces engaging the support 2, is joined on the edge with housing pot 11 as well (and not with retaining plate 5). Housing pot 11 has a borehole 13 for light to exit from. Housing pot 11 and camera 10 are solidly connected with each other via base plate 14.

FIGS. 2 and 3 show the path of the illuminating beam of rays. The light sources 15 are mounted laterally of prism 6 (not visible in FIG. 1 in the plane of the section) in two groups, each comprising three light sources. Light sources 15 are designed, for example in the form of light-emitting diodes with focusing lenses, and aligned with their directional (or aiming) lobes, aimed at object 1. In each case, scatter disks 16 having forward characteristics are interconnected wit h the polarization filter 17. Two slots 18 are provided in cover plate 12, for the exit of light from housing pot 11. Corresponding slots are provided in carrier plate 5 as well. Instead of using individual polarization filters 17, it is also possible to employ two through-extending polarization foils each covering three light sources.

In order to reproduce the pattern of the epidermis separately, all polarization filters 17 and polarization filter 7 in the path of the reproducing rays have to be adjusted in the same direction if light with linear polarization is used. The best effect for the selection of the epidermis is achieved if the common direction of polarization (E-vector) is disposed parallel to the drawing plane of FIGS. 1 and 2, or perpendicular to the drawing plane of FIG. 3. the latter plane is the plane of reflection in which the skin, with slanted illumination and adherence to the reflection condition (for example the Brewster angle), shows a polarizing effect. With approximately vertical illumination, the common direction of polarization may be any direction. If circular polarization light is employed, filters 17 and 7 do not have to be adjusted with respect to the position of rotation.

Figure 4:
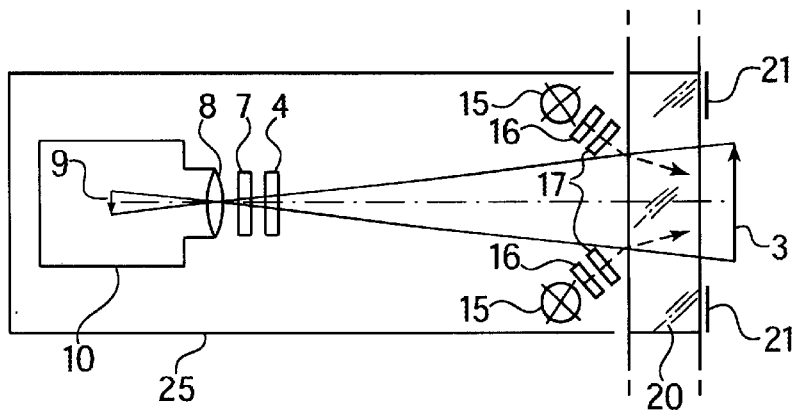
FIGS. 4 to 6 show preferred embodiments of a sensor system for recognizing skin lines of the epidermis and hypodermis.
Figure 5:
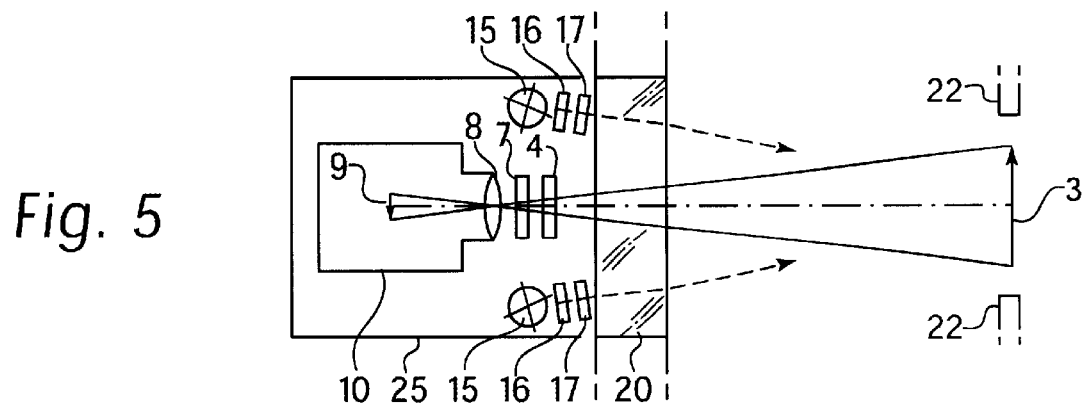
Figure 6:
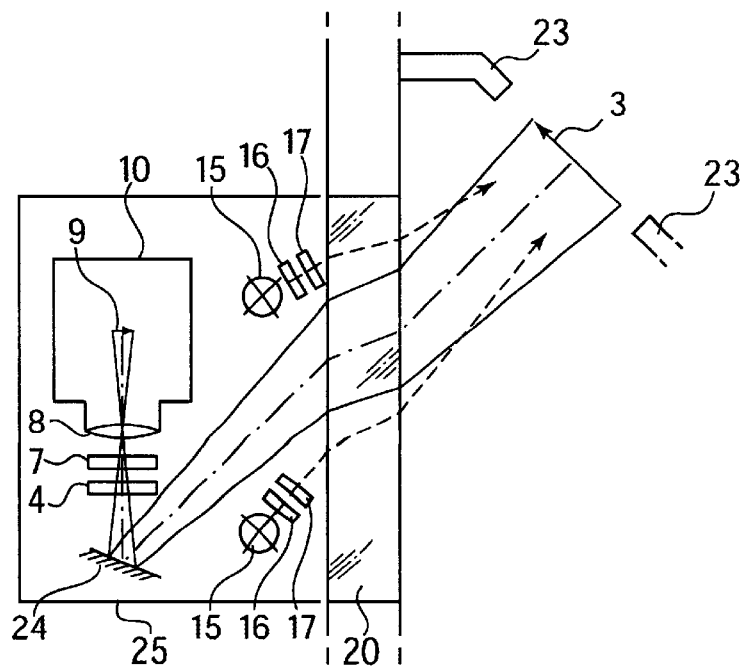

FIGS. 4 to 6 describe preferred embodiments for a sensor system for recognizing skin lines of the epidermis and hypodermis. These devices may be advantageously designed as wall installation units. The system is accommodated in a housing 25, which has a bulletproof glass window 20 on one side. According to the invention, the housing with the sensor system can also be mounted also in front of an existing, larger bulletproof glass wall.

Polarization and interference light filters are arranged in FIG. 4 as camera filters 7 and 4 in front of lens 8. Camera 10 is aimed at object plane 3, which is located in the outer space approximately 4 cm in front of glass panel 20. The lighting consists of four lamps 15, of which two lamps are shown in the drawing. Lamps 15 are designed in the form of directional lamps, e.g., small halogen spotlights aimed at object plane 3. A scatter disk 16, which may be optional depending on which type of lamp is used, and a polarization filter 17 are connected in front of each of the lamps.

When light with linear polarization is employed, the polarization filters are adjusted so that the pair of lamps shown in the drawing plane is polarized perpendicular to the plane of the drawing. If camera filter 7 is adjusted perpendicular to the plane of the drawing as well, the image of the epidermis is obtained with this arrangement (as in the preceding example shown in FIG. 1).

For representing the image of the hypodermis, camera filter 7 can be turned by 90 degrees with an electric drive providing for two locking points. An arrangement which dispenses with mechanical movements, however, is more durable. For this purpose, an additional pair of lamps of the same type is required, in association with a stationary filter 7. This additional pair of lamps, including the adjusted filters, is turned by 90 degrees on the optical axis versus the pair of lamps shown in FIG. 4. The two pairs of lamps are switched on and off, one briefly after the other, for recording the pictures of the epidermis and hypodermis.

The same procedure is used when light with circular polarization is employed. In this case, however, no filter adjustment is needed and the polarization rotation of filters 7, 17 and the turned arrangement 17 have to be taken into account according to the preceding explanations.

Figure 7:
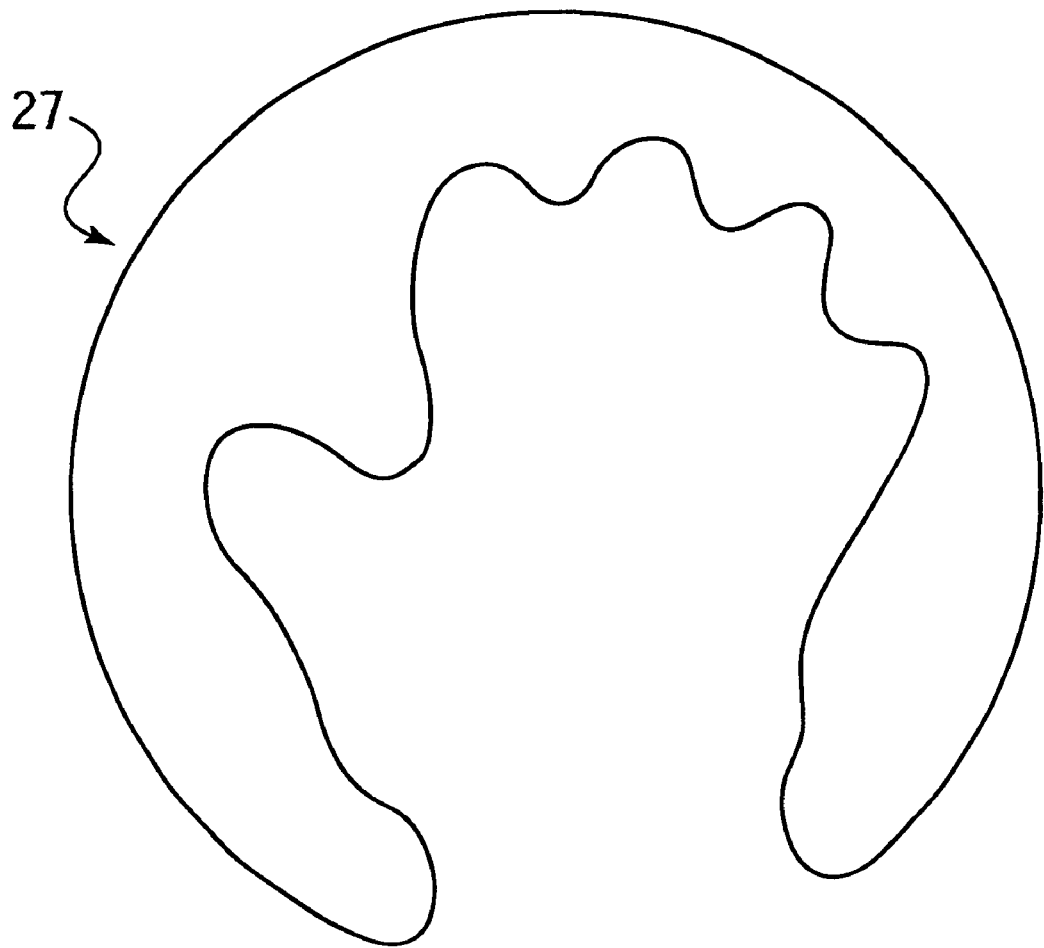
FIG. 7 shows a position pattern model for a hand.

In operation, the user inserts his or her hand into sharp focusing zone 3 with the palm in the forward direction without touching the pane. A template or model 27 shown in FIG. 7, which is located on the glass pane, serves as a positioning aid. The contours of a hand with spread fingers are shown on the model, for example in a simplified or stylized form. The hand line pattern always should be recorded with the fingers spread because fewer picture distortions will then appear, such distortions being caused by the fall of the wrinkles of the skin. The outline of the model or template also encourages the user to spread his or her fingers because it is known from experience that instructions to this extent in a user manual are not always followed.

The path of the light rays may be bent by a mirror or a prism in order to obtain a more compact unit (not shown).

FIG. 5 is a variation of the preceding preferred embodiment, whereby the object plane 3 is spaced some distance from the wall. This distance may amount to as much as a few meters. This design is useful where the access and the control do not take place in the same location. The sensor system can be located in the protected area (behind the bulletproof glass pane), with a sight connection to the system. In this design, illuminating elements 15, 16, 17 are located near camera 10, which makes housing 25 relatively compact. Here, the positioning aid is designed in the form of a frame 22, which, on the inside, has the simplified or stylized contours of a hand with spread fingers. Frame 22 may be mounted by a wall mounting device or, with a larger spacing, on a freestanding column or pillar, or in some other location. The user inserts his or her hand in the frame and aligns the hand to fully cover the model. The dimensions of the interior of the frame are selected so that touching can be easily avoided.

FIG. 6 shows a further variation, where the positioning frame or plate 23 is mounted on a wall in an inclined position. This permits a more comfortable holding of the hand as well as a more compact structure by bending the path of the light rays with mirror 24. The slanted passage of the light rays through bulletproof glass pane 20 causes a certain amount of image distortion, but this distortion is only minor and can be corrected later. According to a further variation not shown here, the housing with the camera and the illumination can be mounted, for example on the ceiling at a reachable level of height, with the sight window aimed downwardly; and a frame of the type of frame 22 or 23, but mounted horizontally, may be used as a positioning aid. The hand is inserted in this frame with the palm facing up. This frame may be wholly or partially made of plastic, and an antenna may be integrated in the frame, if need be, as well.

A further positioning aid for the above-described arrangement is an "aerial" picture projected from the top into or onto the object plane of the camera. According to the invention, such an aerial picture is a double image, produced by two projectors arranged next to one another so that both part pictures or images coincide exactly only in the object plane of the camera and, with correct positioning of the hand, appear coinciding in this plane.

Also halographically produced aerial pictures, for example of marks, hand contour lines or hands, can be used as aids for positioning the hand. In this connection, the hologram plate is preferably mounted on the inside in front of the bulletproof glass pane. A small hole in the hologram may serve for the camera to "look through".

The design arrangements described above, which use images as positioning aids, exclude even accidental touching of any components of the installation.

In order to prevent ambient light, in particular daylight, from interfering with the measurements, and if simple measures such as elimination of interference sources, covering with a screening, etc., are not adequate, the device can be made more insensitive to interfering light as follows:

(1) Cover plate 12 and finger support 2 in the first preferred embodiment should be designed dark, optimally black, and the surface should be roughed up, so that little foreign light is reflected.

(2) Narrow-banded light should be employed, for example with the help of narrow-banded filters or by using colored light-emitting diodes or lasers on the illumination side, and corresponding filters with narrow-banded passages on the reproduction side.

(3) Pulsed illumination, such as a flashlight, pulsed light-emitting diodes (LED's) or pulsed laser diodes is combined with an adapted short shutter time of the recording camera.

Finally, it should be noted that space is also available to cover plate 12, finger support 2, model 21 as well as frames 22 and 23 for the antenna of a contactless (electromagnetic) ID card reader (proximity reader), so that a combination with this method if ID-reading is feasible.

Software Algorithm For Handling Recognition

The comparison of two handline patterns with the goal of making a decision on the identity is, in the ideal case, formally a correlation of the complete patterns. With conformity, and assuming that the quality of the reproduction is good, the coefficient of correlation is then practically 100%.

Figure 8:
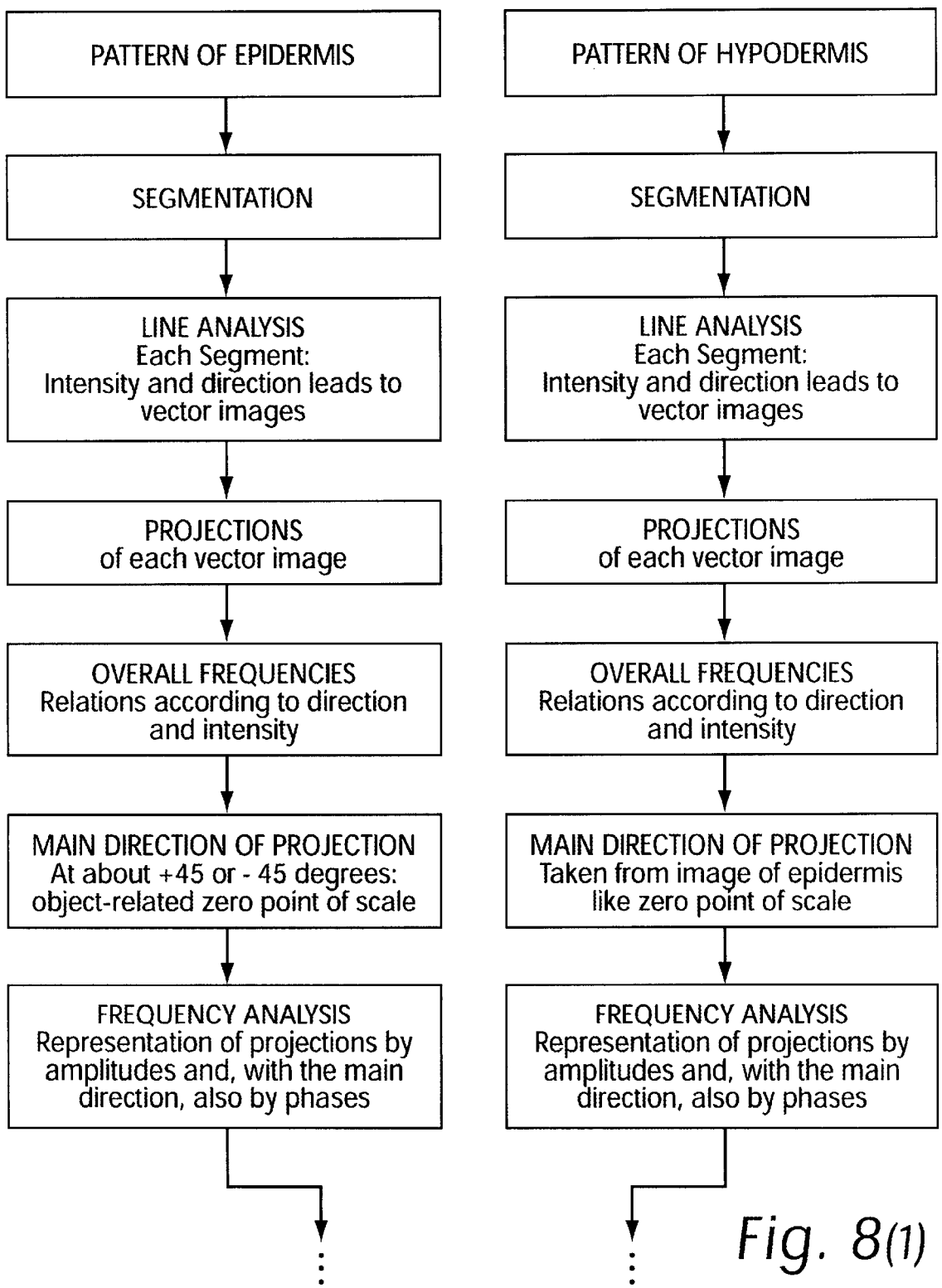
FIG. 8 shows a flow chart illustrating an image processing strategy.
Figure 8:
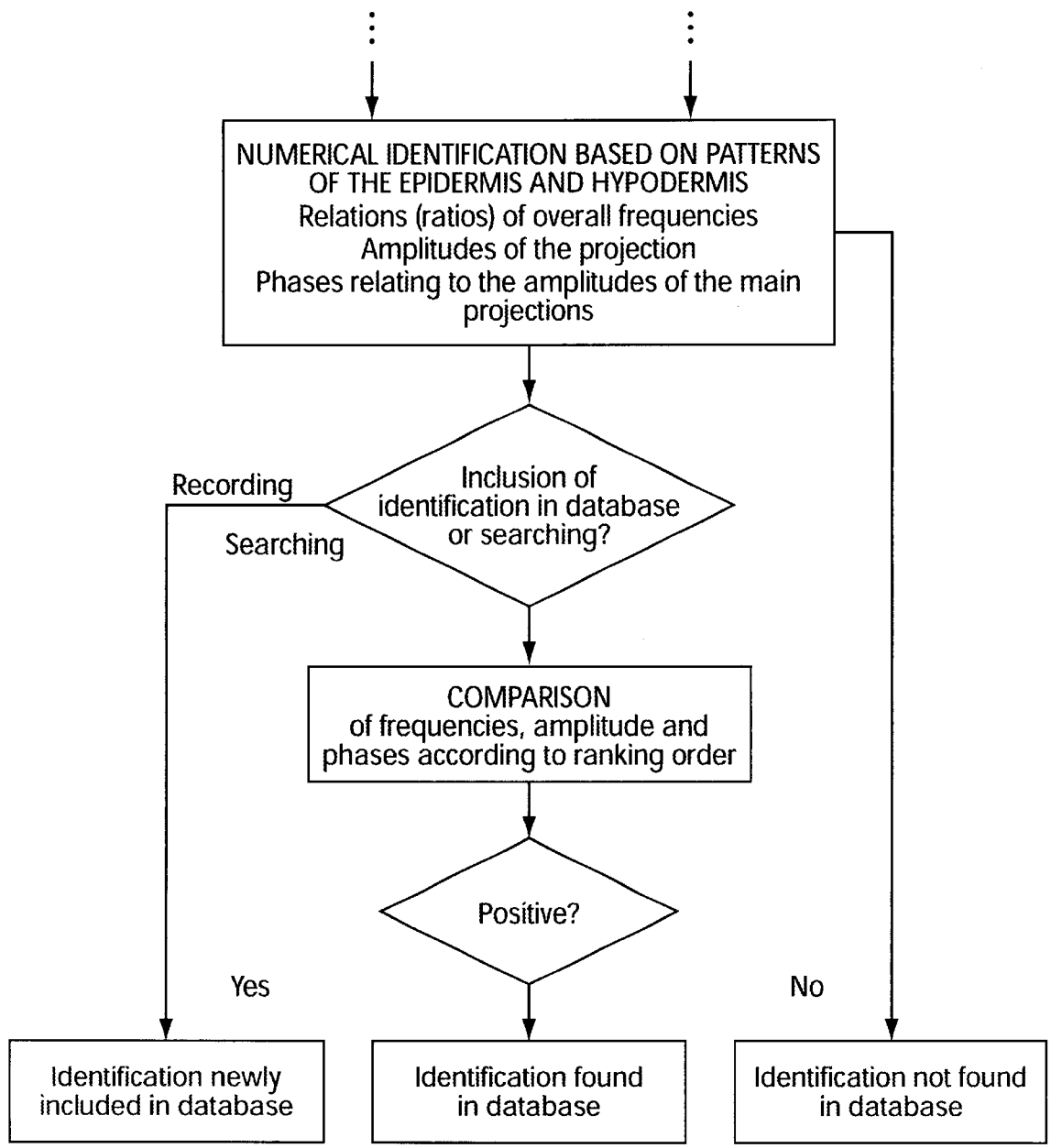

If the image of the person to be identified has to be compared in this way with a great number of stored complete images, the image processing expenditure and in particular the computing time would be too high and long. More favorable are the storage and the comparison of characteristic identification data, or characteristics, containing the features required for a decision. Therefore, image data compression and coding are required. Such compression and coding should be adaptable in a simple manner to the desired conditions, in particular to the "sharpness" of the decision. The strategy of image processing selected in the present case is shown in the flowchart of FIG. 8 and explained in the following. In the text, reference is made to the different blocks of the diagram by underlining.

Apart from any suppression of very high and relatively low room or space frequencies that may be required by filtering (not shown here), the first processing step is segmentation of the epidermis and hypodermis images. This is a division in subunits, for example small boxes, which takes place so that the number of image segments is reduced as much as possible relative to the number of pixels of the initial or starting image in the sense of data compression; however, the detail resolution in the segment image is still adequate for the task here at hand.

In the following line analysis, the segment contents are examined according to line elements having different intensities "I" and directions "D", with approximately 2 to 3 values for "I" and up to about 8 values at the most for "D". Several vectors of the same type (parallel line segments of the same intensity) in one segment are added up. Each segment thus can be described by a number of different types of vectors. When only one type of vector is viewed at a time, i.e., a combination of "D" and "I", vector images are obtained as a result for the various types of vector. It may be advantageous within the framework of optimization of the algorithm to additively combine images of different types of vector, for example in order to avoid excessively low numerical values.

Further data compression takes place through projection of the vector images, i.e, addition of the pixel values in different directions. This corresponds with the recording of a sectional plane according to the process of computer tomography, whereby the object, in this case, is a digitized image field with integral pixel values lower than about 5, and the value zero can be found relatively frequently.

It is known that, with a sufficiently large number of projections, the layer of an object may be reconstructed using a CT-algorithm because the totality of the projections contains the complete object information.

Image recognition (back projection) is not carried out here. However, the information of the projection functions is used for characterizing the image of the hand lines. The number of projections depends on the desired accuracy of image characterization. One advantage of the process is that the required and adequate accuracy can be adjusted by a simple rule, namely the selection of the number of projections. Only a few projections are required in this connection as compared to known computer tomography methods.

First of all, the overall frequencies result in a simple way from the projection functions for each type of vector. The overall frequencies or their conditions are already suitable for roughly characterizing the line pattern.

The next step is the determination of the main direction of projection. For this purpose, we look at the picture of the sum of all vector images with the highest line intensity "I" without taking into account the direction "D", and at the projections of the summation image. The pair of projections with directions at about plus or minus 45 degrees relative to the longitudinal axis of the hand is preferred because the three most strongly pronounced main lines, which are the furrow or groove of the thumb, the five-finger furrow and three-finger furrow, appear as maxima with a large amplitude regardless of whether the right or left hand is used. The well-identifiable maximum, for example of the five-finger furrow, can be used for defining an object-related zero point of the scale. With the other projections, the maximum may serve for fixing the zero point of the scale as well if a very clear maximum is recognizable. Otherwise, the zero point is fixed randomly, for example on the left edge of the image.

The main direction of the projection is searched for with the help of the "printout" of the maxima within the range of plus or minus 45 degrees of the program. It then serves also as the reference direction for the other directions. In this way, a certain rotation invariance of the measuring method is produced as well.

For further data compression, the projection functions are subject to a frequency analysis, whereby the shortest form, the amplitude and, if need be, the phase are selected for representing the frequency components. Characterizing of all projections in the main direction can take place through amplitude and phase values. With the other projections, phase data are object-related only in some cases and generally not directly suitable for the characterization.

The not object-related phase information may possibly be used for pattern identification by reconstructing the projection functions from the amplitudes and phases filed in the answerback code storage and comparing and correlating shapes of the curves. This possibility is not shown in the diagram.

The numerical identification based on the image of the epidermis and hypodermis contains conditions of overall frequencies of types of vectors, sets of amplitudes of the frequency components of the projections, as well as phases relating to the amplitudes of the main projections. It has to be determined empirically how many projections or amplitude/phase sets are generated. This type of characterization of handline patterns is translation-invariant with respect to the hand.

The features can be set up in the numerical identification file in a type of ranking order, which starts with global statements and ends with highly resolved patterns, i.e., at amplitudes and phases of the frequency components for the high space (room) frequencies. The process of feature comparison begins with the overall frequencies and is discontinued in case of nonconformity. The farther one advances in the ranking order without receiving a negative message, the higher the quality of the conformity of handline images.

The analysis of the image of the hypodermis, which is not as strongly structured as the image of the epidermis (but in a different way), takes place in the same manner, whereby the zero points of the scale for the main projections are taken over from the associated images of the epidermis. The number of line intensities "I" may be lower with the hypodermis.

Once an identification has been computed, it is received and included in the data base when a person is registered for the first time. When a comparison of handling patterns is to be carried out, the features of the identification to be checked are compared with the identification data stored in the data base, following the ranking order, so that a positive or negative decision can be made as shown in the flowchart of FIG. 8 at the bottom.

As opposed to finger imprint recognition algorithms which determine the number or arrangement of minutiae, which are peculiarities or special features in the pattern of the papillary ridges, the handline recognition process of the present invention detects (sinusoidal) distribution patterns of "normal" line elements. In the present case, the information content lies less in the three main lines specified above, which individually do not vary very strongly, but more in the network of the slightly thinner secondary lines.

What is claimed is:

1. A method of identifying persons with the use of a light source (15), a polarization filter and a camera (10) with the help of their hand and/or finger lines, characterized in that the hand and/or the finger lines, the patterns of the papillary ridges, or the pattern of the hypodermis are optically detected without contact for the recording of an image by means of a first polarization filter (17) arranged in the path of the illuminating light rays, a second polarization filter (7) arranged in the path of the reproducing light rays, and a camera (10), with a rigid arrangement and with omission of any mechanical movements of the arrangement.

2. The method for identifying persons according to claim 1, charactetrized in that a numerical identification is computed by means of digital image processing, such identification permitting the comparison with filed data of the same type.

3. The method for identifying persons according to claim 1, characterized in that provision is made for an additional light source (15) with a third polarization filter (17) in the path of the illuminating light rays, said light source including the adjusted polarization filter (17) being turned in the optical axis by 90 degrees versus the first polarization filter.

4. The method for identifying person according to claim 3, characterized in that the two light sources (15) are briefly successively switched on and off for recording the images of the epidermis and hypodermis.

5. The method for identifying persons according to claim 3, characterized in that the method is carried out both with linearly and circularly polarized light for selectively representing the epidermis and the hypodermis.

6. The method for identifying persons according to claim 5, characterized in that the selection of the pattern of the epidermis takes place with the rotation of the polarization adjusted in opposite senses in the path of the illuminating light rays and in the path of the reproducing light rays, and the selection of the pattern of hypodermis with the rotation of the polarization adjusted in the same sense, whereby the direction of the rotation (right or left rotation) is defined here as the direction of rotation of the E-vector viewed in the direction of propagation of the light.

7. The method for identifying persons according to claim 3, characterized in that the pattern of the epidermis is selected with the directions of polarization adjusted parallel in the paths of the illuminating and the reproducing light rays, and the pattern of the hypodermis is selected with the directions of polarization adjusted vertically.

8. The method for identifying persons according to claim 7, characterized in that both patterns are recorded with a camera with the same coordinates one shortly after the other.

9. The method for identifying persons according to claim 7, characterized in that each pattern is recorded with one camera.

10. The method for identifying persons according to claim 3, characterized in that the information content suitable for said purpose of both skin patterns available with identical coordinates is combined.

11. The method for identifying persons according to claim 1, characterized in that the hand and/or the finger lines are detected from a larger distance.

12. The method for identifying persons according to claim 1, characterized in that for the recognition of finger lines by means of a recognition algorithm, the relative position of the minutiae is determined and evaluated in the direction of an identification (e.g. Henry code).

13. The method for identifying persons according to claim 1, characterized in that for identifying the finger line of the pattern of the epidermis by means of a recognition algorithm, the frequency of orthogonal features is determined and evaluated in the direction of an identification.

14. The method for identifying persons according to claim 1, characterized in that for recognizing hand lines, the starting image is divided in segments and line sections of different strength and direction are determined in the segments.

15. The method for identifying persons according to claim 14, characterized in that in the segment image, the line sections (vectors) are added up to frequency distributions in the way of a computertomographical sectional-view recording as pixel values in different directions (projections).

16. The method for identifying persons according to claim 13, characterized in that the projections are characterized by the amplitudes and, if necessary, also by the phases of the components of their harmonic approximations (e.g. according to Hartley), and the amplitudes are used with or without phase indication for the numerical characterization of the pattern.

17. A device for carrying out the method according to claim 1, characterized by a first light source (15) arranged in the path of the illuminating light rays and directed at the hand and/or finger lines, the pattern of the papillary ridges, or the pattern of the hypodermis; by an interconnected first polarization filter (17); and by a second polarization filter (7) arranged in the path of the reproducing light rays in front of a camera (10) with an image receiver (9) whose lens (8) is focused on the plane (3) of the object.

18. The device according to claim 17, characterized in that a reversing prism (6) is arranged in the path of the reproducing light rays.

19. The device according to claim 18, characterized in that the light source (15) formed by pair of lamps arranged on both sides of the reversing prism (6).

20. The device according to claim 18, characterized in that a second pair of lamps with a third associated polarization filter (17) is arranged on both sides of the reversing prism (6).

21. The device according to claim 17, characterized in that the arrangement is designed without the possibility of mechanical movement.

22. The device according to claim 20, characterized in that linear polarization filters (17) and, respectively, (7) crossed by 90° are arranged in the paths of the illuminating and the reproducing light rays.

23. The device according to claim 17, characterized in that the light sources (15) are switched on and switched off depending on the direction of polarization of the polarization filters (17) associated with said light sources.

24. The device according to claim 17, characterized in that the image receiver (9) is a CCD-chip.

25. The device according to claim 17, characterized in that the light source (15) is a diode laser.

26. The device according to claim 17, characterized in that the light source (15) is a lamp with glowing metal surfaces under an inclined angle of viewing.

27. The device according to claim 17, characterized in that with equally polarized light sources (15), provision is made for two polarization filters in the path of the reproducing light rays with directions extending vertically in relation to each other, which polarization filters can be individually selectively moved into said path of the reproducing light rays.

28. The device according to claim 17, characterized in that the camera (10), the illuminating system (15, 16, 17), as well as additional optical devices such as, for example a reversing prism (6), a range finder, and hologram lighting are accommodated in a mechanically sealed housing (11, 12), and optically accessible only via a glass pane (20) made of, for example bulletproof glass.

29. The device according to claim 28, characterized in that the identification device is designed in the form of a unit for wall installation.

30. The device according to claim 17, characterized in that the hand and/or the finger can be positioned within the field of vision and within the focusing range of the camera (10) by means of a template (21) or a frame (22; 23).

31. The device according to claim 30, characterized in that the inner contour of the template (21) or the frame (22; 23) has the indicated form of the contour of a hand with spread fingers in the way of a positioning template (27).

32. The device according to claim 30, characterized in that the frame (22; 23) is supplied in the form of a holographically produced air picture.

33. The device according to claim 30, characterized in that the frame (22; 23) is partly or wholly made of metal and designed and adapted in terms of high frequency in such a way that it has the antenna function of a contactlessly operating ID-card reader (proximity reader).

34. The device according to claim 30, characterized in that an optical range finder set to a fixed distance is associated with the frame (22; 23), by means of which range finder the recording of the image can be controlled.

35. The device according to claim 34, characterized in that the range finder operates optically according to the principle of triangulation.

36. The device according to claim 17, characterized in that the switching-in of the device into the ready condition and/or the triggering of the measuring process take place by producing a capacitive connection with the floor on which the user is located, through the body of such user or through capacitive detuning of the positioning frame operating as an HF-antenna, or of an antenna located in the frame, once the hand is in the correct position in the positioning frame.

37. The device according to claim 17, characterized in that the antenna of an ID-card reader operating without contact is integrated in the finger support (2) or in the cover plate (12).

38. The device according to claim 17, characterized in that provision is made in the paths of the illuminating and reproducing light rays for circularly polarizing filters (17, 7), such filters being suitable for representing the images of the epidermis and hypodermis in accordance with their properties.

* * * * *